US005418525A

United States Patent [19]

Frei et al.

[11] Patent Number: 5,418,525

[45] Date of Patent: May 23, 1995

[54] PERSON IDENTIFICATION SYSTEM

[75] Inventors: Alexandra S. Frei, Winterthur; Carlo Haechler, Hittnau; Johann K. Locher, Wetzikon, all of Switzerland

[73] Assignee: Bauer Kaba AG, Wetzikon, Switzerland

[21] Appl. No.: 905,373

[22] Filed: Jun. 29, 1992

[30] Foreign Application Priority Data

Mar. 4, 1992 [CH] Switzerland .......................... 682/92

[51] Int. Cl.[6] .............................................. G06F 7/04

[52] U.S. Cl. .......................... 340/825.34; 340/825.31; 340/825.49

[58] Field of Search ...................... 340/825.31, 825.34, 340/825.49; 235/382, 382.5

[56] References Cited

U.S. PATENT DOCUMENTS

| | | | |
|---|---|---|---|
| 3,757,089 | 9/1973 | Hockler | 340/825.31 |
| 5,051,741 | 9/1991 | Wesby | 340/825.49 |
| 5,263,158 | 11/1993 | Janis | 340/825.34 |

*Primary Examiner*—Michael Horabik

*Attorney, Agent, or Firm*—Walter C. Farley

[57] ABSTRACT

An individual identification system is a modular combination of a person-related first unit with transmittable/-receivable storage elements by way of an antenna, the unit operating alone or together with a further unit having an additional, but different, identification part, and a person-unrelated and instead object-related second unit for the interaction between the person and the object and with a control for checking and maintaining the interaction with which units and objects are cross-linked. The person-related first unit is carrier oriented and is permanently or removably located on a use article, e.g., on a key, in a pass, on or in a watch or any other object which changes position with the person and is not coordinate-fixed. The object-related second unit is place-oriented and is at fixed locations (e.g. building doors), or is arranged in fixed manner on moving objects (e.g. vehicles).

10 Claims, 7 Drawing Sheets

PERSON IDENTIFICATION SYSTEM

FIELD OF THE INVENTION

This invention relates to a system for the identification, access and/or entry control or checking of persons by means of a portable or wearable authorization and/or identification unit interacting with access or entry objects and associated active/passive control or checking elements.

BACKGROUND OF THE INVENTION

Person identification with technical aids generally aims at authorizing access or entry to closed or controlled areas. However, it is also possible to extend this control (identification) to further functions, such as presence control and initiating functions or automatic data transfer, etc. For such functions as a rule passes are issued for certain authorizations (access or entry) and the passes are worn or carried by the authorized persons. The best known example is a plastic card with a magnetic strip, a built-in chip or some other readable code. However, the greatest problem at present is the ever increasing multiplicity resulting from such technical aids, which must be carried by a person and appropriately used in certain situations.

SUMMARY OF THE INVENTION

An object of the present invention is to standardize such aids and also crosslink them with respect to certain initiatable functions. In this connection active aids, i.e. those used by the person for an activity, or passive aids, i.e. those which have an initiating action as a result of the presence of the person are to act in the same way, or more correctly with the same rank. In this way it is possible to randomly combine active and passive "passes", a further field of application being provided by the possibility of combining and varying. This combination can be a physical or only an organizational combination, e.g., a loose network of user means, objects and control elements.

The basis for achieving this is a modular combination of a person-related first unit with transmitting/receiving storage means which interact by means of an antenna, the first unit operating alone or together with a further unit having an additional, but different identification part, together with a person-unrelated but instead object-related unit for interaction between the person and the object, as well as with means for controlling and maintaining the interaction with which the units, users and objects are crosslinked in on-line and off-line manner.

The person-related first unit is wearer or user-oriented and is permanently or detachably carried in the form of a use article, e.g. on a key, in a pass, or in or on a watch or some other article, whose location is changed with the person and is not coordinate-fixed. The object-related second unit is place-oriented and is located on an object either having a fixed location (e.g., the door of a building or other equipment in a building) in which case it is coordinate fixed, or it can be located in a fixed manner on a movable object (e.g. a vehicle). Whether coordinate-fixed or mobile, the object and control unit have a direct relationship with one another, which can be brought about by a wireless connection, e.g., radio. Together a plurality of first and second units forms a system of the following type:

Objects: Buildings, fixed installations, equipment, mobile installations, such as vehicles, ships and aircraft and apparatus in the same having a second system unit.

Functions: Access control, entry control, admission control, time management, presence control, master controls, section and zone controls and transfer from one of these into another, etc.

Carrier: Persons having a first system unit and constituting the carriers are, although uncontrollably mobile, fixedly classified in an overall network.

Purpose: Entry of a person into a building (e.g. certain rooms in which EDP personnel or even cleaners are working), access, i.e. manipulations by a person on a fixed installation (e.g. operation of a car wash by an authorized person) or on equipment (control equipment), time duration of the presence of a person in a mobile installation (e.g. time check on a bus driver) and many other controls and checks in connection with persons.

In such cases a carrier having a first system unit interacts with a randomly situated object having a second system unit. The objects communicate with an evaluation or control unit and communicate with one another, if at all, only by means of an evaluation or control stage or unit. If at all, the carriers communicate with one another solely via an object or a control unit. Thus, the interactions are strictly parallelized and crosslinking of individual objects or carriers only takes place by means of an organization unit (evaluation or control stage). This allows very flexible person identification on fixed and mobile objects with a plurality of place-independent carriers for a plurality of functions. Thus, it is a highly complex, randomly extendable system controllable with relatively simple means.

The System Idea

The present system is extendable with respect to the objects (system elements), but with respect to its information paths constitutes a closed system (with respect to the information paths open systems are also conceivable, but still require more research). The term "closed system" refers to a defined group of objects O (e.g., all the doors of a building, installation and equipment in the building; all the buses and trams in a city, together with the infrastructure for such a public traffic system with plants, equipment, master computers, etc.; all the control locations of a monitoring team) with associated control elements K, on which act an indefinite number of carriers T. With such a system it is possible to associate further objects with control elements, which are, in a manner of speaking, physically incorporated into the closed information system. Such a closed system is linked in a virtual manner by a common data set or structure (basic set/structure, referred to hereinafter as "gene set"). In this way, and as is in any case the situation with the carriers, the objects with their control elements also can be randomly geographically dispersed and/or mobile.

For binding the system together, there is no need for a physically ordered backbone (e.g. network backbones such as Ethernet). It is only necessary to have the common data set, which defines and conveys to other members characteristics of the genus of the system. An indeterminate number of carriers may or may not influence the objects and are not system-associated in a fixed relationship, but rather constitute free system elements. Thus, the system elements are the carriers identified as T's, the objects identified as O's, and the control elements identified as K's. The O's and K's form, with the gene set as the fixed system organizing elements, the system genus with which are associated the free system elements, the carriers or in other words persons, in a manner similar to a loose, cloud-like structure.

The presently defined system according to the invention, realizable and bound together by technical means, obeys the following three basic conditions (or axioms):

1. Between T's there is no direct connection.
2. Between O's there is no direct connection.
3. Between all the other elements and/or combinations of all the elements (e.g., between K's or between O's and K's or between T's and K's) a connection exists, which can be in direct or indirect form.

Thus, there is a connection between K's, a connection between T's and O's, a connection between O's and K's and a connection between T's and K's with the following additional conditions:

A. The information flows through the connection between T's and O's from T to O but not from O to T (asymmetry of the interaction comparable with a diode action);

B. All other connections are symmetrical or bidirectional, i.e. the information propagates in both directions.

Associated T's, O's and K's are elements and form cells (Tx, Kx, Ox), the cells being the basic components within the system. Each cell element (Tx, Kx, Ox) interacts with a random number of elements of another cell (Ty, Ky, Oy), the T's with a random number of O's and the O's with a random number of T's, while the K's interact with a random number of K's of other cells. When considering such a cell in the crosslink or interaction with other cells, it can be seen that through the T→O asymmetry the O's are sinks and the T's are sources. In this respect the K's are comparable with oscillators, because they are the only cell element which can have a symmetrical connection (interaction) with other K's (for information exchange). In addition, each K protects or immunizes its own cell against changes from the outside because of the effect of the gene set.

The cell's own K prevents the 0 of the cell from being modified by any interaction of a T (apart from the K-controlled ones). Thus, there is a protected cell autonomy. The cell has its own set of information, which gives this cell a particular functional location within the system.

Generally, the elements of a cell are only "organizationally" in contact with one another and can be spatially far apart. They have an inherent order, which in the case of interaction of two or more cells propagates over these. Thus, during each interaction, order is produced or fulfilled. This picture is comparable with a clan or family, whose homogeneousness represents the inherent order and whose interaction, e.g. the reaction to the news of the 100th birthday of the great grandmother, brings together the family members from all over the world at a common location (fulfilled order).

If several cells act on one another in such a system, only the cell to which an 0 belongs (Rx, Tx, Ox) and a mesh (described hereinafter) can act on the object O. A mesh is an information path extending beyond a cell to the necessary number of K's to allow the T (e.g. Tz) of another cell (Kz, Tz, Oz) to act on the 0 (e.g. Ox) of a basic cell (Kx, Tx, Ox). Tz acts on Ox only via the K's. For example, Tz contains a code element which is to temporarily undergo a change in Ox (e.g., a time window) and this code element then only acts via the K backbone. For example, if the carrier of Tz is in the building, then the door, in this example, the object Ox, is always open and he does not have to unlock the object Ox, because the information would act via Tz→Oz→Kz→Ky→Kx→Ox. The information path via the K's (here Kx, Ky, Kz) of a closed, but fundamentally extendable system forms the backbone of such a system. All the cells of the overall system are coupled by means of their K's to such a backbone. Cells coupled or docked at a backbone can only act on objects by means of two interactions, by means of their own cell on the in-cell object (Tx→Ox) or via the mesh on a foreign object (Tx→K's→Oy).

A backbone is formed from the quantity of K's of a system. Each K has a "gene set" which contains in permanently written form a set of basic functions such as:

A. a form of system identification (i.e. all the objects belonging to a system to which the indefinite number of carriers T can have access), B. carrier T accrediting (for all designated carriers, whose accrediting is established in this set), C. the immunization against uncontrolled changes (e.g. by the action of a carrier on one or more objects).

This gene set corresponds to the lowest intelligence level of the system and as such brings about a virtual backbone, which acts from K to K without any direct connection (i.e. off-line). This prerequisite keeps the system together and allows it to operate in a fundamental mode, which requires no special approach or activity.

A higher intelligence (the superimposing of additional capacities) is brought about by a brain set, which can be inputted into the K's and functionally extends the system. This higher intelligence requires more communications and therefore a direct connection (on-line) between the K's, but this need not permanently be present. A direct connection is understood to mean a cable connection (also modem/telephone) and/or a wireless connection via radio.

BRIEF DESCRIPTION OF THE DRAWINGS

The above-described system will now be described in detail with the aid of the following drawings.

DESCRIPTION OF THE PREFERRED EMBODIMENTS

Figure 1:
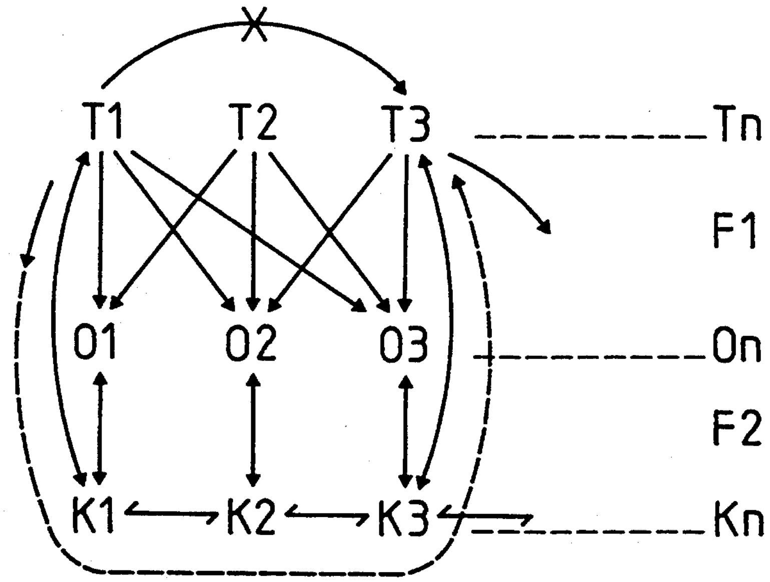
FIG. 1 is a diagram showing the interaction mechanism between a plurality of carriers with associated objects and the corresponding control elements.

FIG. 1 shows the interaction mechanism between three carriers T1, T2, T3, with three objects O1, O2, O3 and three control elements K1, K2, K3 in the indicated manner. The T's form a carrier plane Tn, the O's an object plane On and the K's a control plane Kn. Between the carrier and object plane is formed a dynamic interaction plane, or more pointedly an each-with-everyone plane F1 and between the object plane and the control plane there is a fixed association plane F2, which results from the coupling to the backbone. Within F2 the objects are bound in a direct relationship with their control elements. T1, O1, K1 form a cell. T1 is associated with O1, which can be an office key, dwelling key, safe authorization, etc. and K1 directly controls the object O1. T1 can act on the object O1 and T1 can also act on the control element K1. K1 can in turn act on O1 and T1. T1 can also act on all the other O's, whereas O1 can only act on K1. K1 can act on the other K's, but not on the other O's or T's. T1 can, e.g., not act directly on T3 (symbolized by the upper arrow crossed out with X). T1 can only act by means of K1, K2, K3 (the backbone) on T3 (the path shown by the dotted line arrow around the bottom). The system is extendable in direction Tn, On, Kn, but is closed with respect to information from the outside.

Figure 2:
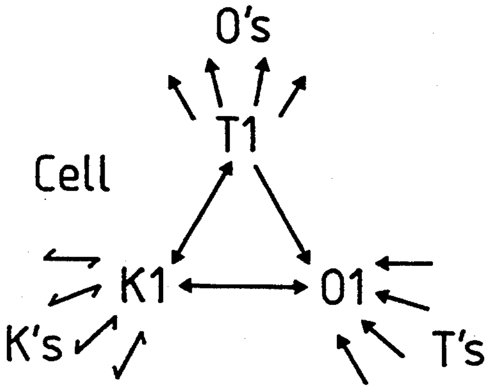
FIG. 2 is a diagram showing a cell T1, O1, K1 in interaction with T's, O's and K's of other cells.

FIG. 2 shows a cell T1, O1, K1 in interaction with T's, O's and K's. The arrow directions immediately make it clear that, with respect to information reception and deliveries, the T's behave as sources and the O's as sinks. The K's perform interactions with other K's and using the aforementioned terminology behave in the manner of oscillators between which information moves bidirectionally, backwards and forwards. The T's can e.g. act on a specific object Ox and the associated Kx senses this action (e.g. in accordance with the gene set of the acting T's) deciding whether the information of this T or its action should be passed to another K and from there to an associated object or carrier. This "allowed" T temporarily becomes a T*, i.e. comparable with a $T_{colored}$, meaning a T on which is temporarily impressed by Kx an item of authorization information. The coloring or accentuation of such a T can be actively withdrawn or can be automatically erased after a certain time.

Figure 3:
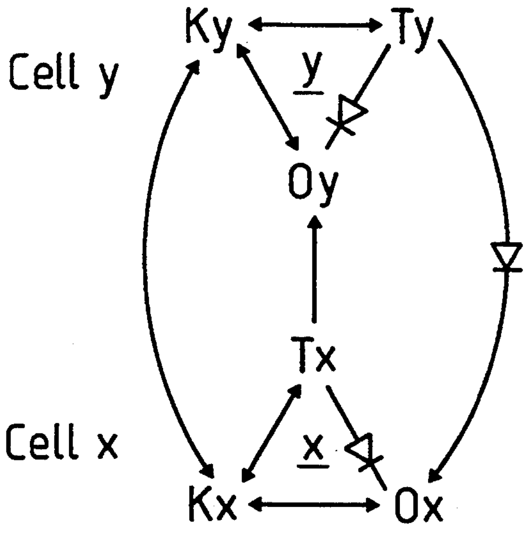
FIG. 3 is a diagram showing two different cells of type x and y in interaction with one another.

FIG. 3 shows two cells x and y of the aforementioned type with all the possible interaction paths. The O's are sinks, so all arrows pass to O; the T's are sources, so all arrows pass away from T; and the K's are oscillators and all the arrows to K are double arrows. It can also be seen that an arrow from T to O is always a single arrow, has only one direction and acts in the same way as a diode (referring to additional characteristics of the person identification system). For symbolizing this characteristic and for clearer illustration, the diode symbol is shown in this path. When one follows all of the possible paths, e.g. starting from Kx and back to Kx, then the following possibilities are obtained:

1. Kx⇄Tx→Oy⇄Ky⇄Kx
2. Kx⇄Tx→Oy⇄Ky⇄Ty→Ox⇄Kx
3. Kx⇄Tx→Ox⇄Kx (circle closure within a cell)
4. Kx⇄Ky⇄Oy⇄Ky⇄Kx (no circle closure)
5. Kx⇄Ky⇄Ty→Oy⇄Ky⇄Kx (no circle closure)
6. Kx⇄Ky⇄Ty→Ox⇄Kx
7. Kx⇄Ox⇄Kx (no circle closure)

Only five paths contain a diode, one of which is the circle closure in its own line. This clearly shows that, because of the symmetry of the interaction (diode action), each path leading out of the cell must necessarily pass via control elements (the backbone) and is therefore always controllable. No matter how highly complex the network finally becomes, this simple measure in the cell leads to the control and influenceability of the complete network.

Figure 4:
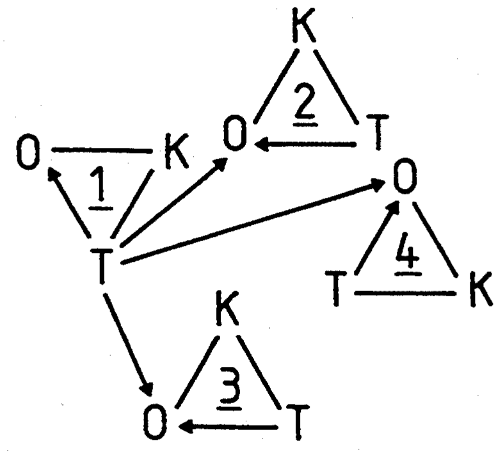
FIG. 4 is a diagram showing four different cells of types 1, 2, 3, 4 in interaction via a carrier T1 of cell 1.
Figure 5:
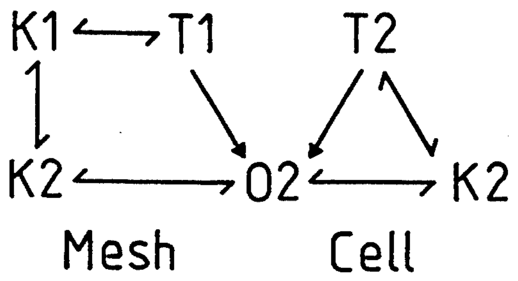
FIG. 5 is a diagram showing a cell 1 and a cell 2 in interaction via the object O2 and how this interaction leads to a basic or fundamental mesh.
Figure 6:
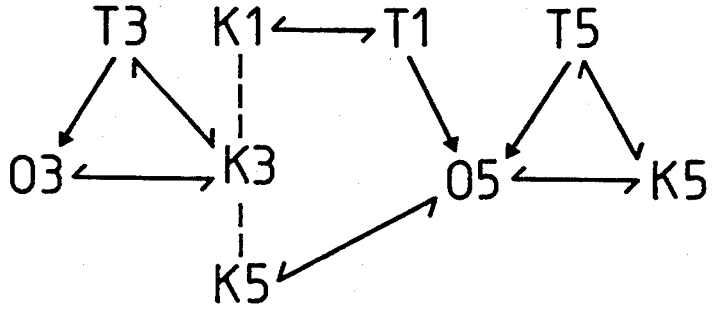
FIG. 6 is a diagram showing the interaction between a cell 1 and a cell 5, how a backbone is formed by means of the mesh, and how a cell 3 is docked or coupled to the backbone.
Figure 7:
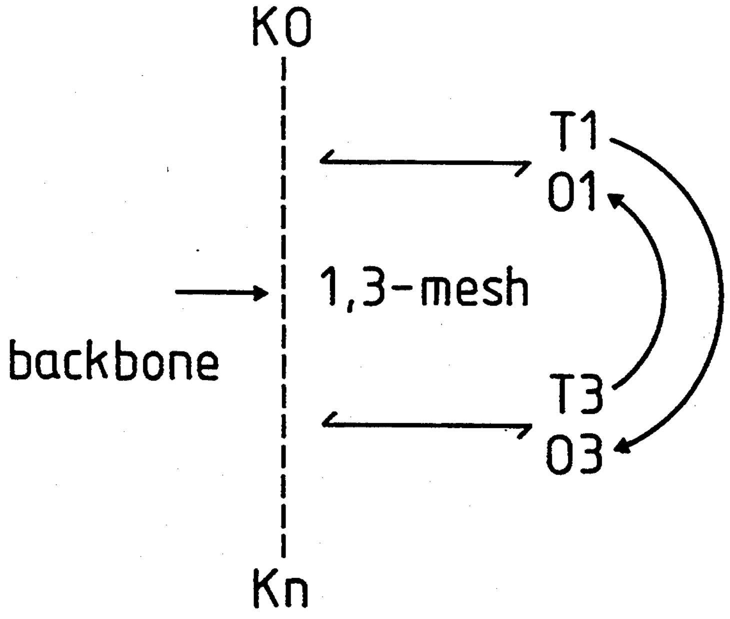
FIG. 7 is a diagram showing a general backbone and the interaction between two cells 1 and 3 (forming a 1,3 mesh), which gives an organization instruction for the K's.

FIG. 4 shows four cells 1, 2, 3 and 4 interacting with the cell elements T, 0, K via T1, i.e. via the carrier of cell 1, which acts on the O's, which are the objects of the other cells such as a carrier of an identification which authorizes the closing or opening of objects 1 to 4. Each of these objects is under the control of the associated K which contains a basic data set (the gene set). T1 cannot act actively on, i.e., directly change the status of, any of these O's and none of the O's can directly change the status of T1. A reciprocal action is only possible via the cell's own K. FIGS. 5, 6 and 7 show how this takes place. The following drawings show a concealed and therefore invisible link, which is maintained even in the case of maximum physical disorder in the system (e.g. in the case of mobile objects and carriers with a plurality of different identification carriers and decentralized control units) and always maintains organizational order in the system in its entire dynamics (i.e. it is an inherent, but concealed order).

FIG. 5 shows a part T1 of a cell 1 and a complete cell 2, in which both carriers T1 and T2 act on the object O2 of cell 2. This shows how so-called meshes are formed from interactions of cells. The object of cell 2 is connected to that of the cell of the appertaining control element K2. Moreover, by definition the K's are interconnectable, i.e., the K2 of the cell is also connected with the K1 of the other cell as shown on the left-hand side of the drawing. It is possible to see K2 within a cell on the one hand and on the other (the same K2) as part of a mesh, where it is connected to K1. The elements K1, K2 with T1 and O2 together form the smallest possible mesh, i.e. an elementary mesh. A mesh has a "diode" and a feedback path through the elements K and only one cell (basic or elementary cell) and one mesh (which need not be an elementary mesh) can act actively on an object (e.g. a closing system O2 modified by the carrier T2 and by the control element K2, or by consent by any K in the mesh, e.g., changing a PIN code or a password). Thus, meshes are formed by connections between control elements. An elementary mesh is formed by two adjacent cells.

FIG. 6 shows the extension of an elementary mesh formed by adjacent cells in order to constitute a general mesh formed by non-adjacent cells, by means of a cell 5 with the object O5, and the cell 1 with the carrier T1, both cells interacting with carriers T1 and T5 via object O5. The mesh now extends from O5 via K5 . . . K1 to T1 and a cell 3, whose K3 is part of the section docked or incorporated in the section K5 . . . K1. This point could be compared with a synapse, but this analogy would not apply in all cases if it is borne in mind that the elements K can be spatially randomly dispersed, e.g. a bus fleet.

In a logical further development, FIG. 7 shows a virtual backbone extending from Ko to Kn, which are organizationally, but not spatially, ordered control elements K, to which are connected or linked the cells and which cells form random meshes via the backbone. A 1, 3 mesh between the cells 1 and 3 is shown, but there could also be 2, 7 or 8, 12 meshes and in short x, y meshes. The organizational instruction for the K's of a backbone is: docked or fitted cells (bound-in cells) can only bring about two interactions on objects, namely, by way of the cell on its own object and by way of meshes on foreign objects. In the backbone the master intelligence form of the gene set is fixed, each K has a set of basic functions, which are virtually (organizationally) interconnected and on which can be superimposed a higher intelligence, which forms the brain set.

The gene set corresponds to the lowest intelligence level of the system and by means of the K's is impressed on the backbone. It acts without any electrical interlinking, i.e. off-line (stand alone). However, the brain set requires more communication and can extend over the entire backbone, or only over parts thereof, and acts on-line.

Figure 8:
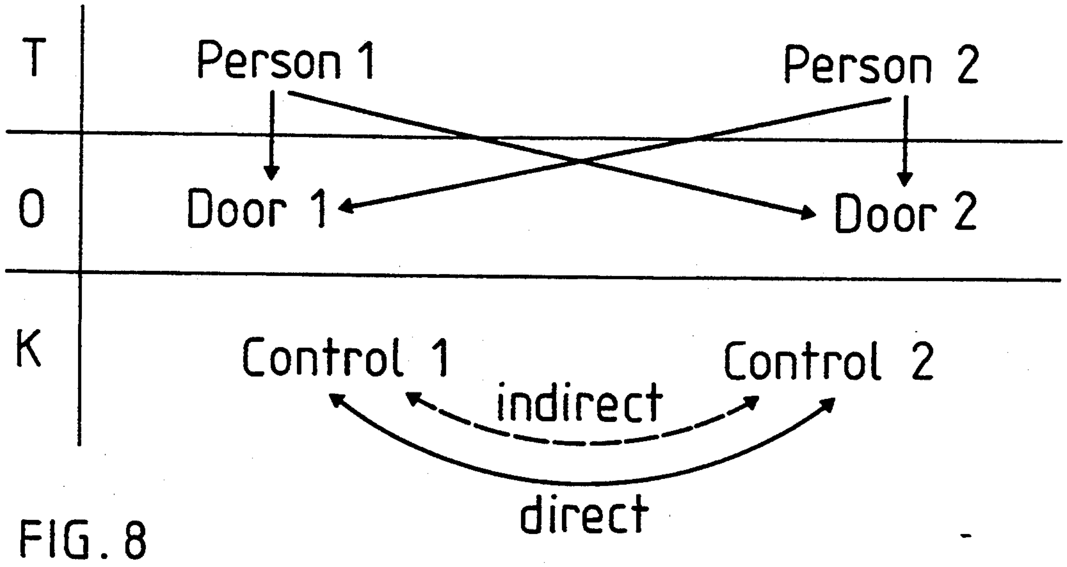
FIG. 8 is a diagram showing in a transition to different scenarios the relationship (interaction) between two persons 1 and 2, their associated objects 1 and 2 and the appertaining control elements 1 and 2 in carrier, object and control planes.

As a transition to the subsequently described scenarios, FIG. 8 shows the relationship (interaction) between two persons 1 and 2, their associated objects 1 and 2 and the appertaining control elements 1 and 2 in the carrier, object and control plane. This example will facilitate the application of the principles of the invention and in particular will clarify visualization of the backbone, because now all the K's are arranged in a common plane.

In the T plane there are two persons T1 and T2, which can both act on the two objects O1 and O2 of the object plane, the doors 1 and 2, which are monitored by the two control elements K1 and K2. These two K's are part of a backbone, which is further propagated. As has been stated, the two K's are indirectly associated or interconnected (off-line) by a gene set, symbolized by the dotted line, and can also be directly interconnected (on-line) by a brain set. This gives the following fundamental relationship:

| | |
|---|---|
| Features (indirect): | Relationship T1, O1 |
| | Relationship T2, O2 |
| | Permission T1 → O2 |
| | Permission T2 → O1 |

Entry into rooms 1 and 2 is regulated without direct action (i.e. off-line) which represents information from the gene set. Additional information from the brain set (i.e. on-line) corresponds:

| | |
|---|---|
| Additional (direct): | Presence of T1 in O2 |
| | Absence of T1 from O1 |

Thus, by means of data evaluation, it is established that person 1 is in the room of person 2 and that there is no one in room 1. It is possible to derive functions therefrom, e.g. telephone calls of person 1 are transferred into room 2 (for as long as he is there) and room 1 is automatically closed (until person 1 returns). Room 1 is opened again when person 1 returns.

Thus, in this very simple example, the significance of the gene and brain sets is illustrated. Feature detection takes place by means of the indirect (off-line) connection with data or information of the gene set representing a basic organization and the data exchange and processing takes place by means of the direct (on-line) connection with data or information of the brain set and requires processor capacity. A cell with memory contains e.g. relationship data, permission data, time windows, etc., i.e. the static or rather invariant part of the system, and a cell with processor and memory processes the fixed data with events and sequences, i.e. the dynamic or variable part of the system.

Figure 9:
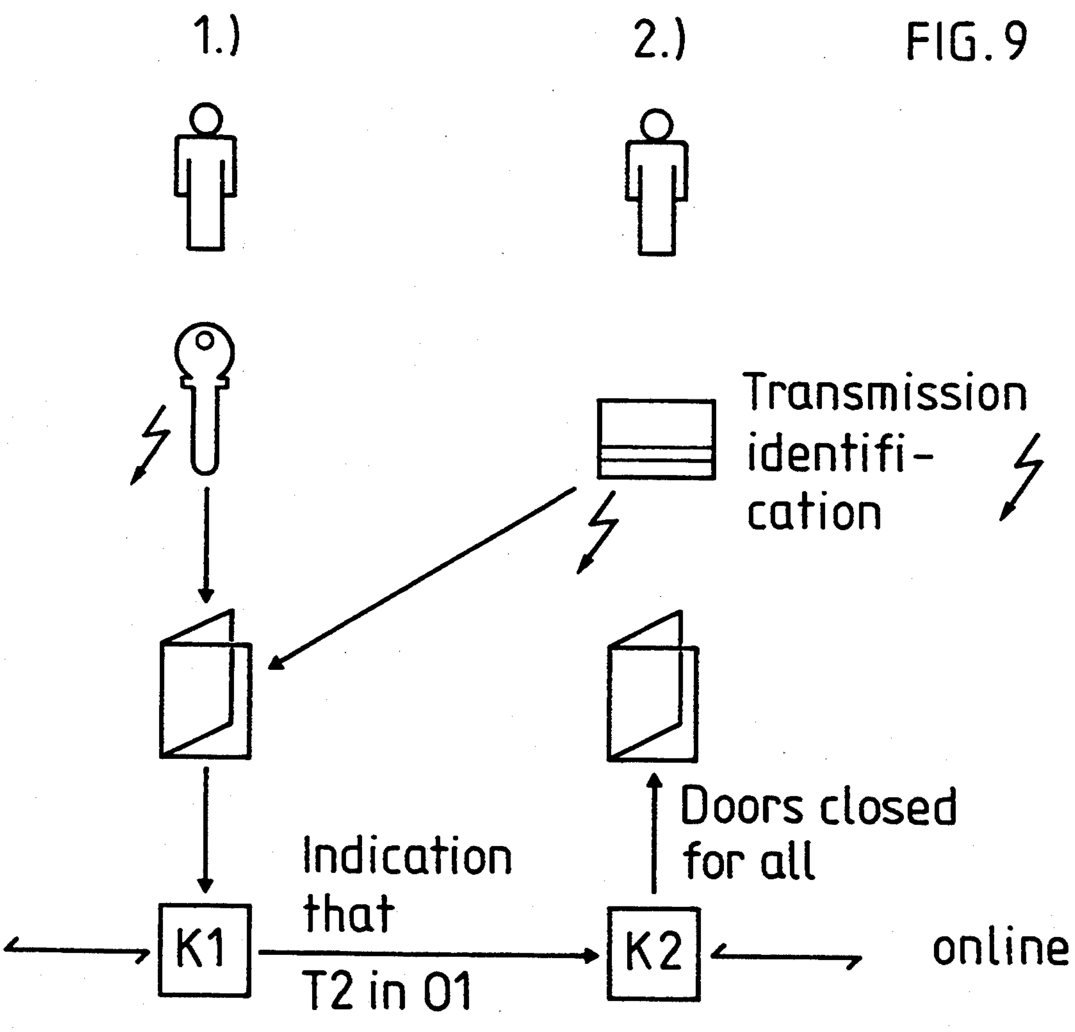
FIG. 9 is a diagram showing a first scenario similar to FIG. 8.

In an arrangement somewhat similar to FIG. 8, FIG. 9 shows a first scenario. A cell 1 and a cell 2 is in each case represented by a person (T1, T2), carrying information means, in the case of person 1 a key and person 2 a chip card. Associated doors (O1, O2) are controlled by an on-line-connected backbone segment K1, K2. The authorization from T2 to O1 is fixedly regulated and requires no action, being part of the gene set information. The communication from K1 to K2 that T2 is in O1 and the action from K2 to O2, namely to lock the doors because the office is unoccupied, are to be regulated on a situation basis and require active intervention. This time-dependent action is a matter for the brain set and is, e.g., brought about technically using transmitter/transponder means and via a K1–K2 connection (wire, modem, etc.). The key of person 1 and the chip card of person 2 in each case have transmitting means and the objects in conjunction with the backbone segments K1, K2 equivalent to the control elements K1, K2 react on the basis of the gene and brain set information in accordance with the time-independent and time-dependent features or functions.

Figure 10A:
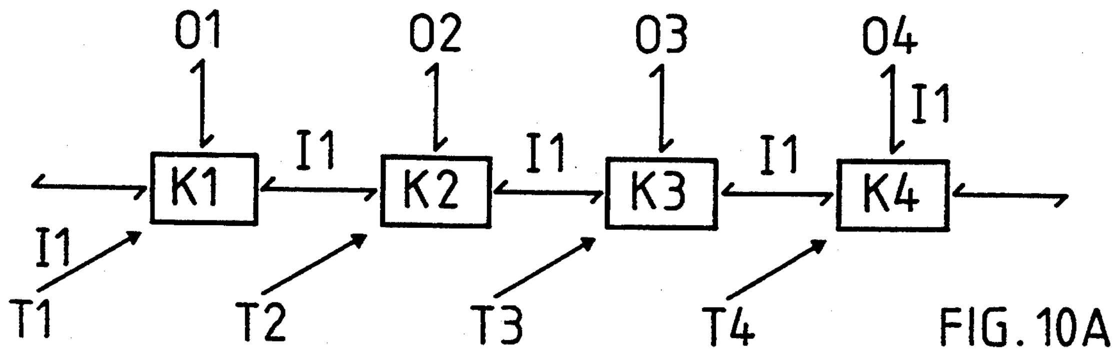
FIG. 10 (A,B,C) is a diagram showing possibilities A, B and C of the way in which the backbones can be organized, e.g. by emulation.
Figure 10B:
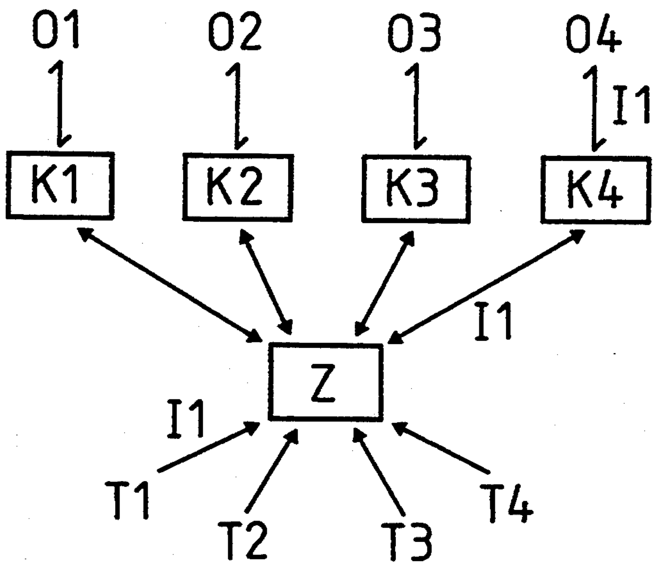
Figure 10C:
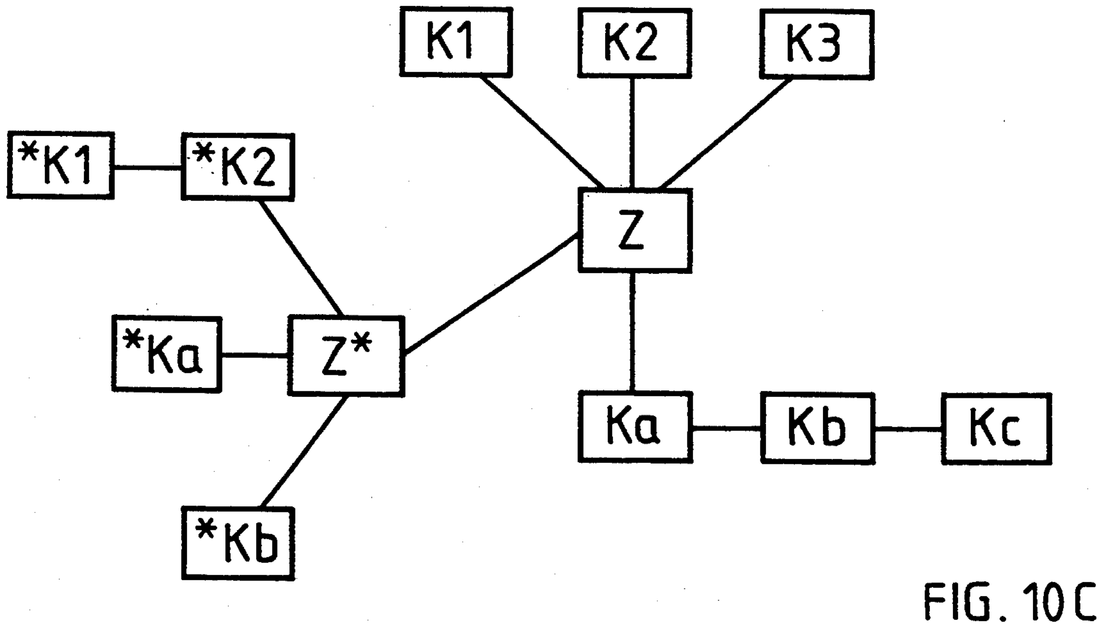

FIGS. 10A, 10B and 10C show two possibilities for realization of a backbone. In FIG. 10A, the backbone is an organizationally or physically linear chain of segments . . . K1→K2 . . . K4 . . ., through which e.g. an item of information I1 passes from T1 through all K's to O4 (serial backbone). All the T's act on their cell-corresponding segments K of such a backbone and from there, by way of other control elements with modification authorization, on the O's (or directly on all the O's and due to the omission of control points K a change authorization is excluded).

In Fig. 10B the organizational or physical backbone is emulated by a central computer unit Z. An item of information I1 from T1 passes through central unit Z and segment K4 to the object O4 (emulated backbone). In this case, the control elements are interconnected by means of the central computer, which performs the backbone function. Instead of acting on the corresponding K, all the T's act on the central unit Z which, for the T's, represents the backbone and also the control point of the actual cell.

In FIG. 10C is shown a mixed form of the two "arrangements", so that, as will be stated hereinafter, so-called control clusters can be formed, which can be realized by a subordinate computer. It is possible to see in this mixed network a serial backbone Ka, Kb, Kc connected to a central computer and a backbone K1, K2, K3 emulated by this computer, together with a subcomputer Z* for a cluster, which in turn emulates a backbone *Ka, *Kb and also "looks after" a serial backbone *Ki, *K2. All of these complicated crosslinks always are in accordance with the above-given principle, which is defined by the previously given basic conditions.

Figure 11:
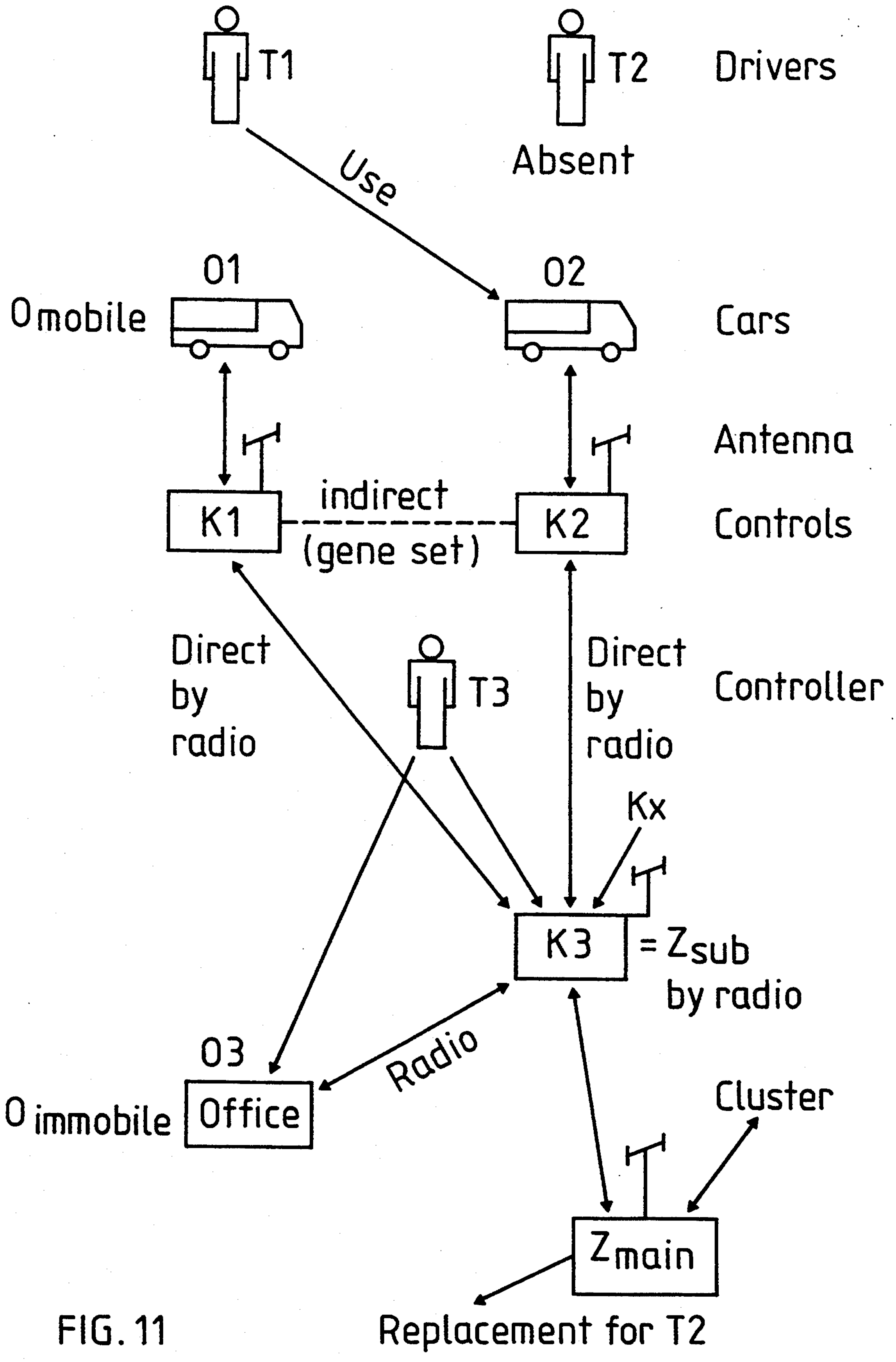
FIG. 11 is a diagram showing a second scenario.

FIG. 11 shows a special scenario, namely the use of a control cluster. The control cluster functions like a subcentral unit with backbone emulation (e.g. a group with the same gene set), which is connected to a central unit and leads to the relieving of this central unit by the connection of such clusters. Such a scenario has a certain complexity, but can easily be brought about by the above-described system instruction. A control cluster can be compared with a further backbone, which is managed by a central unit. Thus, a central unit can control a plurality of backbones. In this scenario it becomes apparent for the first time that the backbone constitutes a decentralized system unit, whose parts or elements can be at different locations and are organizationally strictly ordered off-line by the gene set and on-line by the brain set.

This can best be illustrated by the control units of mobile objects, such as a fleet of cars with a random number of vehicles. For simplicity, only two vehicles and a controller office as objects are represented. This scenario of three is also combined into a cluster, which is connected to a main control unit $Z_{main}$.

In this scenario the participants are three T's (two drivers and a controller); 3 O's (two cars $O_{mobile}$ and one office $O_{immobile}$; and three K's (K1 and K2, as well as a K3 equivalent to a $Z_{sub}$, $Z_{sub}$ being a control cluster) as well as a central unit $Z_{main}$. On each control unit K is shown an antenna, which illustrates the fact that it is bound into an on-line operation for brain set transmission. The relationships are as follows: K1 and K2 are indirectly connected by a gene set, K1 to K3 and K2 to K3 directly via radio by a brain set. K3, which obviously also has a gene set, is connected by means of a brainset to a Kx and to $Z_{main}$. $Z_{main}$ can be connected to further control clusters, which is illustrated by a double arrow pointing toward the word "cluster".

The predetermined details concerning this scenario are that T2 is a driver for special uses, who becomes unavailable and must be replaced by an equivalent driver T1, i.e., T1 must be removed from O1 and allocated to O2. Controller T3 must control this new use via K3 and a replacement is sought for T2 (in reality for T1). According to this gene set, it must be a Tx with a Kx from the same group (replaces T2) and by the brain set controls. "replacement for T2 replaces Ti". This shows that this scenario cannot be regulated by the gene set alone. K1, K2 and K3 form the backbone along with a cluster $Z_{sub}$ connected to a master unit $Z_{main}$.

This makes very clear the effect of the above-discussed concealed order maintaining in constant order fundamentally simple systems, which have a complex activity and all this can take place without an "ordering" hand.

Figure 12:
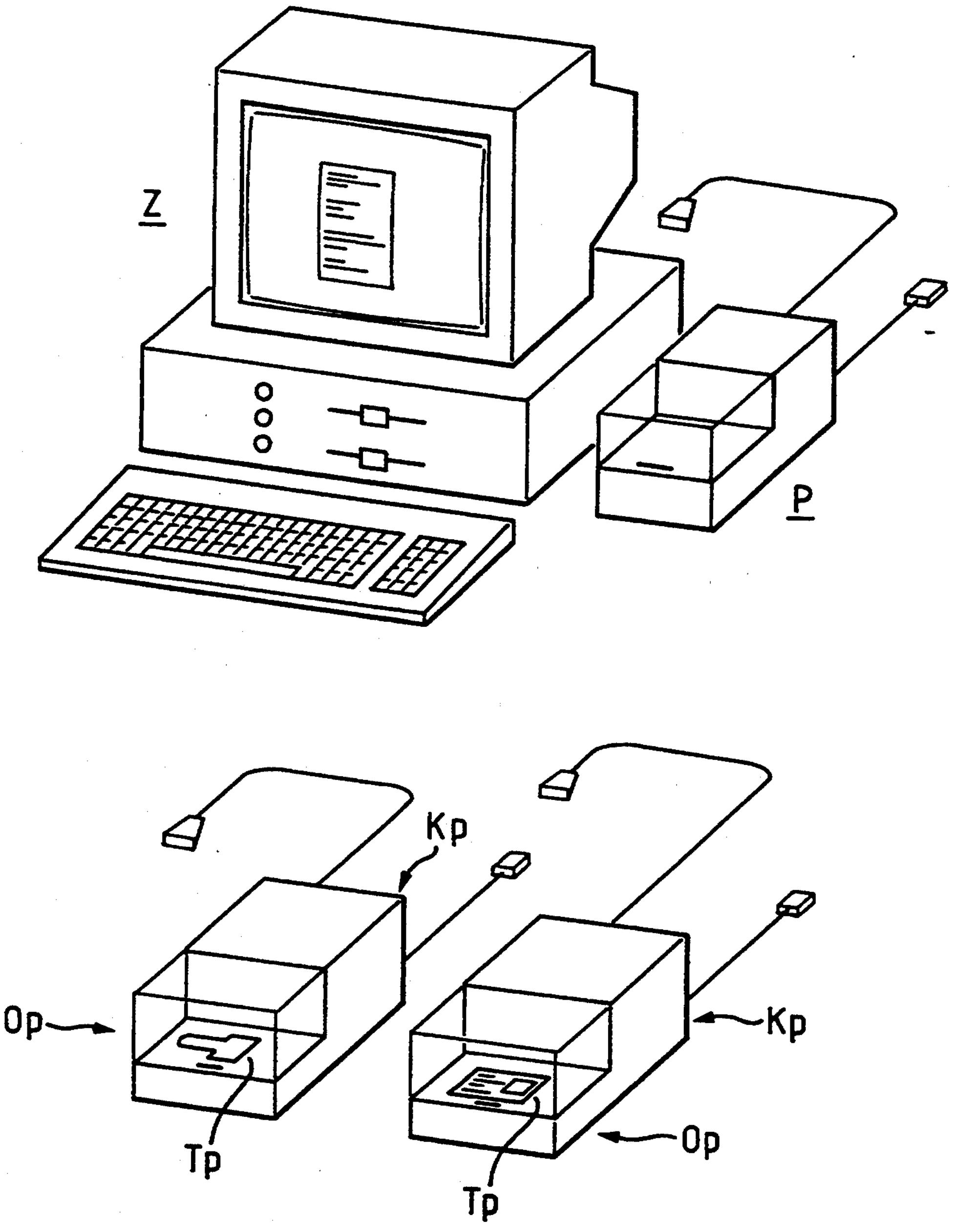
FIG. 12 is a diagram schematically showing a programmer O with access control K and with a read/-write station K for changing T's (here chips in keys)
Figure 13:
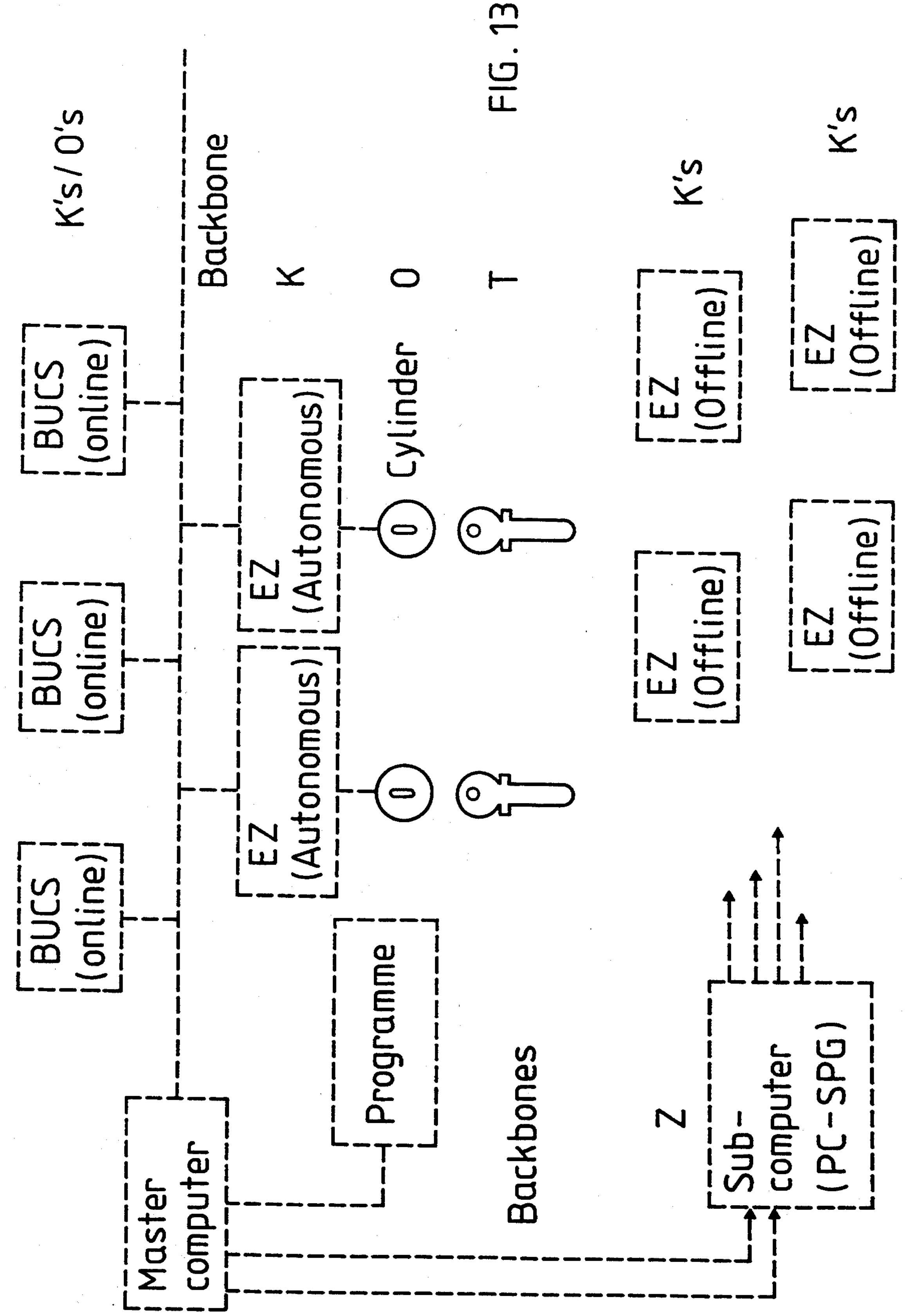
FIG. 13 is a diagram showing a programmer in a system, such as is connected to the backbone.

FIGS. 12 and 13 show a very simplified specific case, a chip programmer designated T, 0, K. The programmer for programming a person identification chip (whereby such chips can be on cards, keys or any other object Tx) is used inter alia for reading and/or programming chips. The programmer Op is an individual unit and, apart from an authorization reader and a read-write station, it contains a control station Kp, which is connected by means of a standard electrical interface to another control station K (K e.g. being a master computer in the backbone by means of which the brain set information is distributed) and said connection takes place in on-line or stand-alone manner. The stand-alone connection is brought about by the gene set in Kp and the on-line connection is used for superimposing the brain set. The individual use types are subdivided into differently protected hierarchies or planes.

The identification for use, i.e., the authorization to operate the read-write station, takes place as follows. The user Tp to be authorized is identified on the authorization reader with an authorization card on which writing can take place for organizational reasons. The active use of the chip programmer is only possible accompanied by permanent read communication of the authorization card and the authorization reader may only read. In the active reading process the card is kept controlled in the reception unit. If the authorization card is removed, it is no longer possible to operate the read-write station. It is pointed out that the authorized user, who by programming in the programmer has gene sets and further data in other chips for a plurality Tx, e.g. the keys of an entire factory and which are to be programmed, is a Tp user, like the office owner, bus driver, etc., in other scenarios. Together with the programmer Op to which he has "access" and with the control station Kp on which he can act, he forms a cell (Tp, Op, Kp), which is connected via the interface to the backbone, to which is connected the intelligence supplying cell (T1, O1, K1) with the master computer O1 and its control unit K1 and the operator T1. Tp is now in a position to receive data from O1 which, under the control of the backbone, enables him to program a random number of chips of Tx, i.e. to store the gene and brain sets therein. Said Tx, e.g. keys in a factory, can then act on objects Ox, i.e. the doors of the factory, which then belong to the same backbone and therefore have the same gene. The influence of such Tx is nonexistent on other objects, such as another factory. Thus, the programming cell and the master computer cell must belong to the same cell system as the numerous user cells formed by key carriers, doors and control stations.

A gene set for the above-discussed system can be in the following form: Entry authorization, master data for upload, master data for download, terminal identification, pass definition and user level.

A brain set can then contain the following data: Arrival time, departure time, parameter upload, parametrization, start/finish and free/block, start/finish diagnosis, repeat/erase data, connect on-line, connect offline, connect autonomous, set clock time/date, erase, request end download master sets, as well as other configuration measures.

Another specific case is an entry control system, which has three basic elements "carrier-object-control", i.e. constitutes an integrated whole, instead of considering only one function in isolation. A control system connects these three parts in the form of a system-integrated building management, taking account of dependencies, overlaps and points in common. Therefore the control system is in a position to link events from the entry control or time determination, e.g., with an action in the building automation. The system is used for securing rooms, areas, test locations, research laboratories, EDP centers, etc. The person in the entry control system is the carrier of a pass T having entry and access data such as entry, authorization, maintenance on the object O, and pass reader, which are distributed in the building or on a plant, machine, etc. therein and said objects contain in their associated control elements K the person-related or place-related, monitoring-relevant data. Unlike in the case of entry control, which is to be considered spatially, they contain access control, which is to be considered operatively, e.g., access to the programmer for entry control system or specific EDP equipment, their data and information.

The gene set of such a system includes, e.g., personnel master data, entry profiles, authorization of passes, entry levels, access or entry zones, etc. The brain set includes, e.g., variable door opening times, variable door monitoring times, pass only or pass with secret code required, time zones, time zone levels, entrance/exit control, double entry barrier, presence control, etc. These functions can be inputted and/or varied by a PC. The distribution of such information over the control elements is brought about by the backbone on an on-line basis. The cells (Tx, Ox, Kx) formed in this way may be room cells (offices, laboratories, workshops), equipment authorization cells (EDP equipment, master computer cell, programmers, data readers, machines), zone cells (floors, room groups) and so on, in which the O's are the sinks and the T's the sources (each T can act on each O, the associated K checking access or entry by means of the sets). Each object, the card reader on doors, equipment, machines is bound off-line into the organization by the stored gene set and via on-line connection is connected to one or more computers, e.g. clusters. These connections are generally realized by a standardized interface such as RS-232 in the case of PC's and can be interlinked by lines or radio.

A further specific case is "integral building management". In a building there are several access and authorization control means O, which can be influenced by chip cards, chip keys or other objects T, which have a communicatable chip. The control means are card readers, a locking cylinder with a reader, reception equipment, which can receive and evaluate a signal from a T article. The control means have associated control elements K in which the gene set is stored, as it is stored in mobile stores of the T elements. The entire building (considered from the system, the memories of the control elements K and the mobile elements T) has in a first level a basic data set, which subdivides a second level into groups, e.g. floors. In further levels, the basic data set can be further grouped.

These are invariant data. The brain set can be superimposed on the backbone and supplies the variable data to the control elements, which make it possible to influence the T elements by way of objects (e.g. controller K, card reader/writer O for a chip card or electronic center K, locking cylinder O for a chip key), but this can only take place by its own K element. A remote reading takes place by means of the amplification of the emitted signals of a T element by means of a booster, as described in Applicant's European patent application EP-A-448,507.

The result is a complete building management system with the regulation and control of the heating, ventilating and air-conditioning equipment and alarm equipment via access control; monitoring and door control, via the access control combined with the entry control; entry control in general; time and presence control via the entry control, control monitoring and reporting via access and entry control and finally data control and work monitoring by access control.

We claim:

1. A system for identifying individuals and controlling access authorization comprising the combination of a plurality of identification units (T) each associated with and carried by a person and each having stored therein a unique code-set at least including a presence code identifying the carrying person;

a plurality of object units (O) each associated with an object to which access is selectively permitted or denied;

a plurality of control units (K) having means for recognizing selected codes of said unique code-sets as constituting authorization codes to perform a function at selected object units;

each of said identification units (T), said object units (O) and said control units (K) includes a memory for storing a data set common to all of said units by which all of said units are recognized as belonging to a defined system;

means for establishing bidirectional communication links between said control units (K);

means for establishing a communication link between selected pairs of identification units (T) and object units (O) limited to unidirectional communication from each said identification unit to an associated object unit, communication between identification units (Ts) and between object units (Os) being limited to communication through associated control units (Ks); and means for establishing a bidirectional communication link between one control unit (K1) and a selected identification unit (T1, T2, . . . Tn), and between said one control unit (K1) and a selected object unit (O1), whereby, in response to communication of an authorization code from an identification unit to said object unit (O1) and recognition thereof by said control unit (K1), a predetermined function at said object unit (0O) is performed.

2. A system according to claim 1 wherein, in the absence at an object unit of a recognized presence code of a carrier (T), a second predetermined function is performed at at least one selected object unit.

3. A system according to claim 2 wherein said second predetermined function is instructing another object unit to perform said first predetermined function 4. A system according to claim 1 which further includes a program stored in at least one of said control units (K) and object units (O) for performing control functions in response to sensed conditions.

5. A system according to claim 1 wherein said communication links are established between units so that said units are functionally grouped in cells, each cell including one identification unit, one object unit and one control unit, and wherein an identification unit in one cell communicates with an identification unit in a different cell through said control unit in said one cell and said bidirectional communication links between said control unit in said one cell and a control unit in said different cell.

6. A system according to claim 2 wherein said control units have transmitting/receiving means for exchanging identification and function data with each other.

7. A method of identifying individual persons and thereby controlling access to objects including the steps of providing each person with an identification unit (T) to be carried by the person, providing each said identification unit (T) with a memory having stored therein a machine-readable code-set defining at least a unique identification of the person and with means for communicating to object units and control units at least said identification, positioning a plurality of object units at a plurality of locations at which transmissions from identification units are received when persons carrying said identification units are using said identification units on one of said plurality of object units, each object unit having a memory and having a predetermined function associated therewith, providing a plurality of control units each having a memory and having a data processor, storing in the memory of each said identification unit, object unit and control unit a common data set by which said units are recognized as belonging to a defined system, establishing a bidirectional communications link between each said control unit and each other said control unit, and between each said control unit and selected identification and object units, communicating to a control unit an identification received by the object unit which receives the identification from within the predetermined distance, and determining in the control unit functions to be performed at the locations of receiving object units and at object units not receiving identifications as persons move between object units, whereby locations and access authorizations of persons can be determined automatically.

8. A method according to claim 7 and further including a program stored in at least one of said control units (K) and object units (O) for performing control functions in response to sensed conditions.

9. A method according to claim 7 which includes organizing the control, identification and object units into cells each having one control unit, one identification unit and one object unit, the object and identification units within each cell comprising the selected identification and object units with bidirectional communication links to the control unit in that cell, and communicating to and from object units and identification units in one cell from and to object units and identification units in another cell only through control units and the bidirectional link between control units.

10. A method according to claim 7 wherein transmission from an object unit to a control unit requires the additional step of contacting the object unit with the identification unit to convey identification information.

* * * * *